(12) United States Patent
Kishi

(10) Patent No.: US 8,612,338 B2
(45) Date of Patent: Dec. 17, 2013

(54) METHOD, PROGRAM AND APPARATUS FOR COLLECTING PURCHASE INFORMATION USING NETWORK

(75) Inventor: Hiroyuki Kishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1760 days.

(21) Appl. No.: 09/986,026

(22) Filed: Nov. 7, 2001

(65) Prior Publication Data

US 2002/0143651 A1 Oct. 3, 2002

(30) Foreign Application Priority Data

Apr. 2, 2001 (JP) ................................. 2001-103022
Sep. 10, 2001 (JP) ................................. 2001-273285

(51) Int. Cl.
*G06Q 40/00* (2012.01)
(52) U.S. Cl.
USPC .............................................. 705/38; 705/35
(58) Field of Classification Search
USPC ................ 705/16, 38, 26, 20, 21, 22
See application file for complete search history.

(56) References Cited

U.S. PATENT DOCUMENTS

| | | | | | |
|---|---|---|---|---|---|
| 5,367,148 A | * | 11/1994 | Storch et al. | ................... | 235/375 |
| 5,490,060 A | * | 2/1996 | Malec et al. | ..................... | 705/10 |
| 5,857,175 A | * | 1/1999 | Day et al. | ......................... | 705/14 |
| 5,903,878 A | * | 5/1999 | Talati et al. | ...................... | 705/26 |
| 5,924,078 A | * | 7/1999 | Naftzger | ......................... | 705/16 |
| 5,974,396 A | * | 10/1999 | Anderson et al. | ............... | 705/10 |
| 5,978,774 A | * | 11/1999 | Rogers et al. | ..................... | 705/24 |
| 5,979,753 A | * | 11/1999 | Roslak | ........................... | 235/380 |
| 6,018,719 A | * | 1/2000 | Rogers et al. | ..................... | 705/24 |
| 6,039,244 A | * | 3/2000 | Finsterwald | ................... | 235/375 |
| 6,041,309 A | * | 3/2000 | Laor | ................................. | 705/14 |
| 6,049,778 A | * | 4/2000 | Walker et al. | ..................... | 705/14 |
| 6,055,573 A | * | 4/2000 | Gardenswartz et al. | ....... | 709/224 |
| 6,108,642 A | | 8/2000 | Findley | .......................... | 705/44 |
| 6,154,738 A | * | 11/2000 | Call | ................................... | 707/4 |
| 6,251,017 B1 | * | 6/2001 | Leason et al. | ................... | 463/42 |
| 6,260,026 B1 | * | 7/2001 | Tomida et al. | ................... | 705/38 |
| 6,298,330 B1 | * | 10/2001 | Gardenswartz et al. | ........ | 705/14 |
| 6,389,401 B1 | * | 5/2002 | Kepecs | ........................... | 705/14 |

(Continued)

FOREIGN PATENT DOCUMENTS

| | | | | |
|---|---|---|---|---|
| EP | 0 961 253 A2 | 12/1998 | ............... | G07G 1/14 |
| JP | 11-066152 | 3/1999 | | |
| JP | 2000-293549 | 10/2000 | | |

OTHER PUBLICATIONS

United Kingdom Search Report received in UK counterpart application GB 0127572.6.

*Primary Examiner* — Kristen Apple
(74) *Attorney, Agent, or Firm* — Staas & Halsey LLP

(57) ABSTRACT

A purchase information collecting method collecting reliable purchase information about any kind of commodity using a network. In the purchase information collecting method, a server apparatus is used, which communicates with a seller computer and a purchaser computer, and which stores received sales information in the first storing part when the sales information identifies a deal about a commodity and is generated and transmitted by the seller computer. The server apparatus, when receiving purchase information, which consists of personal information of a purchaser of a commodity and the sales information that is presented to the purchaser by a seller of the commodity, judges whether the sales information included in the received purchase information is stored in the first storing part. If the sales information is stored, the server apparatus stores the received purchase information as valid purchase information in the second storing part.

14 Claims, 10 Drawing Sheets

| COMPANY CODE | SHOP CODE | DATE | DEAL NUMBER | COMMODITY CODE | UNIT PRICE | QUANTITY | SUM | U-FLAG |
|---|---|---|---|---|---|---|---|---|
| 001 | 10 | 2000/12/24 | 001 | 49101 | 1000 | 1 | 1000 | 0 |
| 001 | 10 | 2000/12/24 | 003 | 49102 | 500 | 1 | 500 | 0 |
| 002 | 222 | 2000/12/25 | 060 | 49101 | 1000 | 1 | 1000 | 0 |
| 002 | 222 | 2000/12/25 | 070 | 49101 | 1000 | 1 | 1000 | 0 |

(56) References Cited

U.S. PATENT DOCUMENTS

| | | | | |
|---|---|---|---|---|
| 6,442,276 B1* | 8/2002 | Doljack | | 380/51 |
| 6,484,146 B2* | 11/2002 | Day et al. | | 705/14 |
| 6,519,572 B1* | 2/2003 | Riordan et al. | | 705/16 |
| 6,564,189 B1* | 5/2003 | Nycz | | 705/20 |
| 6,584,448 B1* | 6/2003 | Laor | | 705/14 |
| 6,615,184 B1* | 9/2003 | Hicks | | 705/26 |
| 6,748,365 B1* | 6/2004 | Quinlan et al. | | 705/14 |
| 6,847,935 B1* | 1/2005 | Solomon et al. | | 705/14 |
| 2001/0013011 A1* | 8/2001 | Day et al. | | 705/14 |
| 2001/0014878 A1* | 8/2001 | Mitra et al. | | 705/39 |
| 2001/0032165 A1* | 10/2001 | Friend et al. | | 705/37 |
| 2001/0034658 A1* | 10/2001 | Silva et al. | | 705/26 |
| 2001/0034685 A1* | 10/2001 | Kutaragi et al. | | 705/36 |
| 2001/0042023 A1* | 11/2001 | Anderson et al. | | 705/26 |
| 2001/0051901 A1* | 12/2001 | Hager et al. | | 705/26 |
| 2001/0054007 A1* | 12/2001 | Minakawa et al. | | 705/26 |
| 2001/0054081 A1* | 12/2001 | Fujiwara | | 709/217 |
| 2002/0010623 A1* | 1/2002 | McCollom et al. | | 705/14 |
| 2002/0019777 A1* | 2/2002 | Schwab et al. | | 705/26 |

* cited by examiner

FIG. 2

| COMMODITY CODE | BRAND NAME | UNIT PRICE |
|---|---|---|
| 49101 | E-FOOD | 1000 |
| 49202 | F-FOOD | 500 |
| 49201 | G-FOOD | 500 |
| 49102 | H-FOOD | 500 |

FIG. 3

| COMPANY CODE | SHOP CODE | DATE | DEAL NUMBER | COMMODITY CODE | UNIT PRICE | QUAN-TITY | SUM |
|---|---|---|---|---|---|---|---|
| 001 | 10 | 2000/12/24 | 001 | 49101 | 1000 | 1 | 1000 |
| 001 | 10 | 2000/12/24 | 001 | 49202 | 500 | 2 | 1000 |
| 001 | 10 | 2000/12/24 | 002 | 49201 | 500 | 2 | 1000 |
| 001 | 10 | 2000/12/24 | 003 | 49102 | 500 | 1 | 500 |

FIG. 6

| COMPANY CODE | SHOP CODE | DATE | DEAL NUMBER | COMMODITY CODE | UNIT PRICE | QUAN-TITY | SUM | U-FLAG |
|---|---|---|---|---|---|---|---|---|
| 001 | 10 | 2000/12/24 | 001 | 49101 | 1000 | 1 | 1000 | 0 |
| 001 | 10 | 2000/12/24 | 003 | 49102 | 500 | 1 | 500 | 0 |
| 002 | 222 | 2000/12/25 | 060 | 49101 | 1000 | 1 | 1000 | 0 |
| 002 | 222 | 2000/12/25 | 070 | 49101 | 1000 | 1 | 1000 | 0 |

FIG. 7

| NAME | ZIP CODE | ADDRESS | AGE | OCCU-PATION | COMPANY CODE | SHOP CODE | DATE | DEAL NUMBER | COMMODITY CODE | UNIT PRICE | QUAN-TITY | SUM | EVALUATION RESULT IDENTIFIER |
|---|---|---|---|---|---|---|---|---|---|---|---|---|---|
| FUJITSU TARO | 140-8508 | TOKYO... | 30 | OFFICE WORKER | 001 | 10 | 2000/12/24 | 001 | 49101 | 1000 | 1 | 1000 | OK |
| FUJITSU TARO | 140-8508 | TOKYO... | 30 | OFFICE WORKER | 002 | 222 | 2000/12/25 | 066 | 49101 | 1000 | 1 | 1000 | NG |
| FUJITSU TARO | 140-8508 | TOKYO... | 30 | OFFICE WORKER | 003 | 11 | 2000/12/25 | 010 | 49201 | 1000 | 1 | 1000 | UNIDENTIFIED |

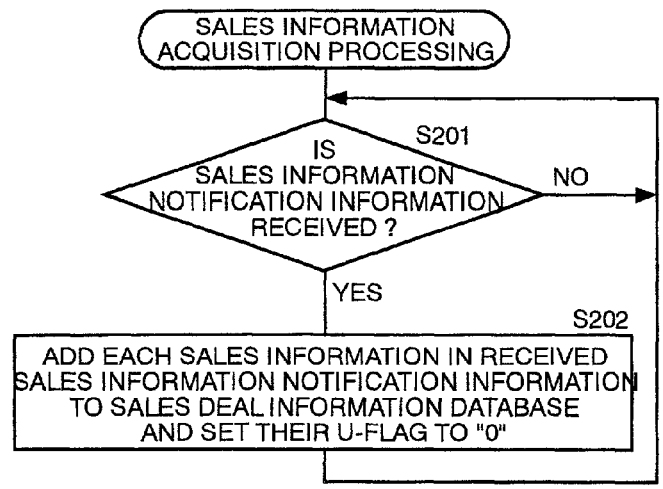
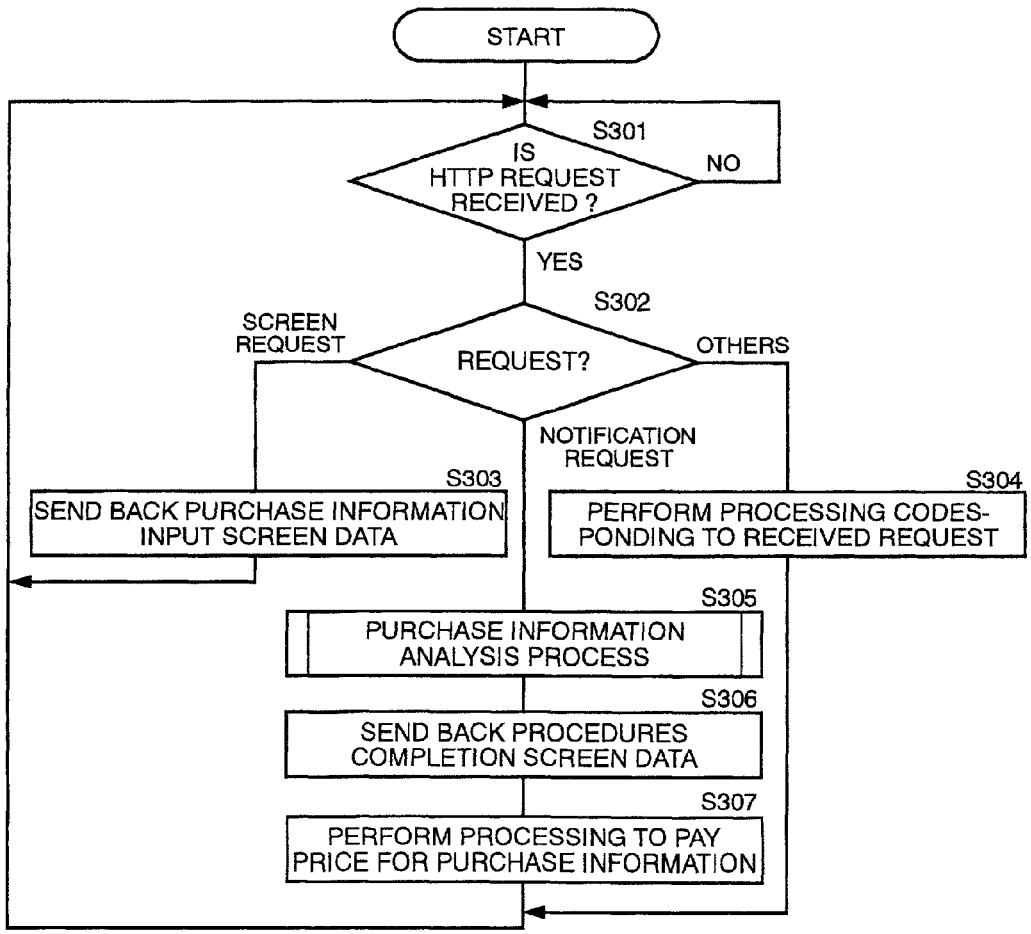

FIG. 11

ENTER PURCHASE INFORMATION

NAME [FUJITSU TARO] ~51
ZIP CODE [140-8508] ~52
ADDRESS [TOKYO SHINAGAWA OHI 1-20-10] ~53
AGE [30] OCCUPATION [OFFICE WORKER] ~55
54
COMMODITY [49101:E-FOOD ▼] ~56
57

| COMPANY | SHOP NAME | PURCHASE DATE | DEAL NUMBER | UNIT PRICE | QUANTITY |
|---|---|---|---|---|---|
| A-SUPERMARKET ▼ | TOKYO BRANCH ▼ | 2000/12/24 | 001 | 1000 | 1 |
| B-SUPERMARKET ▼ | GINZA BRANCH ▼ | 2000/12/25 | 066 | 1000 | 1 |
| C-SUPERMARKET ▼ | YURAKUCHO BRANCH ▼ | 2000/12/25 | 010 | 1000 | 1 |
| ▼ | ▼ | | | | |
| ▼ | ▼ | | | | |

[BACK] [NEXT] [SUBMIT]
  60     61      50

FIG. 12

| NAME | ZIP CODE | ADDRESS | AGE | OCCUPATION |
|---|---|---|---|---|
| FUJITSU TARO | 140-8508 | TOKYO .. | 30 | OFFICE WORKER |

| COMPANY CODE | SHOP CODE | DATE | DEAL NUMBER | COMMODITY CODE | UNIT PRICE | QUAN-TITY | SUM |
|---|---|---|---|---|---|---|---|
| 001 | 10 | 2000/12/24 | 001 | 49101 | 1000 | 1 | 1000 |
| 002 | 222 | 2000/12/25 | 066 | 49101 | 1000 | 1 | 1000 |
| 003 | 11 | 2000/12/25 | 010 | 49101 | 1000 | 1 | 1000 |

FIG. 14

| COMPANY CODE | SHOP CODE | DATE | DEAL NUMBER | COMMODITY CODE | UNIT PRICE | QUAN-TITY | SUM |
|---|---|---|---|---|---|---|---|
| 001 | 10 | 2000/12/24 | 001 | 49101 | 1000 | 1 | 1000 |
| 001 | 10 | 2000/12/24 | 001 | 49202 | 500 | 2 | 1000 |

FIG. 15

| COMPANY CODE | SHOP CODE | DATE | DEAL NUMBER | COMMODITY CODE | UNIT PRICE | QUAN-TITY | SUM |
|---|---|---|---|---|---|---|---|
| 001 | 10 | 2000/12/24 | 001 | 49101 | 1000 | 1 | 1000 |
| 001 | 10 | 2000/12/24 | 003 | 49102 | 500 | 1 | 500 |

METHOD, PROGRAM AND APPARATUS FOR COLLECTING PURCHASE INFORMATION USING NETWORK

BACKGROUND OF THE INVENTION

1. Field of the Invention

The present invention relates to a purchase information collecting method and purchase information collecting apparatus for collecting information about purchased commodity and its purchaser using a network, and to a purchase information collecting program for making a computer connected with a network to perform the purchase information collecting method. The present disclosure also relates to subject matter contained in Japanese Patent application No. 2001-103022 (filed on Apr. 2, 2001) and Japanese Patent application No. 2001-273285 (filed on Sep. 10, 2001), which are expressly incorporated herein by reference in its entirety.

2. Description of the Related Art

There are some retailers that collect, in order to have a better understanding of customers' needs and behavior, purchase information consisting of information on sold commodity and personal information on customer purchased the commodity in the following way.

The retailers ask their customers to gain a membership which entitles one to buy commodity at reduced price by submitting his or her personal information (name, address, age, occupation, etc.). When a customer submits his or her personal information to such a retailer, the retailer gives a membership card (magnetic card or IC card) recording unique member number, and stores the submitted personal information in a member database as information related to the member number. The retailer, when selling one or more commodities to a member (customer having the membership card), asks the member to show his (or her) membership card. The retailer, when selling commodity to a member, reads the member number from the membership card and then stores information about the purchased commodities as information associated with the read member number, thereby obtaining purchase information.

Purchase information is useful for all sorts of companies, since the better understanding of purchasers' needs and behavior enables company to minimize under- or overstocking, or to conduct to each customer an customized advertising (direct-mail advertising and the likes).

The companies such as manufactures or wholesalers, however, cannot collect purchase information in the method above, because they have no opportunity of contacting the purchasers directly. Therefore, these companies adopt different methods for collecting purchase information.

For example, some manufacturers that make expendables such as foods or office supplies collect purchase information by asking purchasers to send a postal matter (application postcard or letter) containing an evidence that one or more commodities are purchased (for instance, application seal affixed on commodity, portion of wrapping where the bar code is printed) and personal information using a gift or better after-sales service as an incentive to make purchaser to send the postal matter. Furthermore, some manufactures that makes commodities such as electric products, software product, etc. collect purchase information by web page to which purchaser can input the identifier assigned to the purchased commodity (product ID, serial number) and his or her personal information also using a gift or better after-sales service as an incentive.

The former method is inferior to the above-mentioned method adopted by retailers in the point that enough amount of purchase information to perform accurate trend analysis cannot be collected, because purchaser who considers the work required to send the above-mentioned postal matter (for instance, the work to prepare the demanded evidence, stick the evidence on an application form, fill in the application form with personal information, and put the application form in a mailbox) is worth doing for the incentive never sends the postal matter.

On the other hands, use of the latter method allows a company to collect purchase information about most of sold commodities, because filling in data to the web page can be done more easily than sending postal matter. However, to collect accurate purchase information with using this method, companies must assign identifier which is not easily forged to each commodity but not to each kind of commodity, because, if such identifier is not assigned to each commodity, company cannot obtain see trough frauds to get the incentives, and therefore the company cannot collect reliable purchase information.

Accordingly, the objects of the present invention are to provide a collecting purchase information method and a collecting purchase information apparatus capable of collecting reliable purchase information about any kind of commodity using a network, and to provide a purchase information collecting program which is able to make a computer connected with a network to function as the server apparatus for performing the purchase information collecting method.

SUMMARY OF THE INVENTION

To accomplish the above objects, according to the purchase information collecting method of the present invention, a server apparatus capable of communicating with a computer managed (operated) by a seller and a computer operated by a purchasers, stores, when receiving sales information that is capable of identifying a deal about a commodity and is generated and transmitted by the computer managed by the seller, the received sales information on the first storing part. When receiving purchase information that consists of personal information of a purchaser of a commodity and the sales information that is presented to the purchaser by a seller of the commodity, the server apparatus judges whether the sales information included in the received purchase information is stored in the first storing part, and, if the sales information is stored, stores the received purchase information as valid purchase information in the second storing part.

That is, according to the purchase information collecting method of the present invention, each piece of received purchase information is verified with using pieces of sales information that are transmitted from sellers and are stored in the first storing part. Since verification with sales information can be done even if identifier is not assigned to each commodity and use of the network enables each purchase to transmit purchase information easily, use of this method allows any company to collect reliable, enough amount of purchase information to perform accurate trend analysis.

BRIEF DESCRIPTION OF THE DRAWINGS

These and other objects and advantages of the present invention will become clear from the following description with reference to the accompanying drawings, wherein:

FIG. 2 is a diagram showing a configuration of a commodity master file in a purchase selling system included in the purchase information collecting system;

FIG. 3 is a diagram showing a configuration of a purchase information database in the purchase selling system;

FIG. 6 is a diagram showing a configuration of an original sales information database in a purchase information collecting system included in the purchase information collecting system;

FIG. 7 is a diagram showing a configuration of a purchase information database in the purchase information database in the purchase information collecting system;

FIG. 8 is a flowchart showing operation procedures of the purchase information collecting server under the control of a purchase information collecting and evaluating program;

FIG. 9 is a flowchart showing operation procedures of the purchase information collecting server under the control of a purchase information collecting and evaluating program;

FIG. 11 is a diagram showing a configuration of purchase information input screen;

FIG. 12 is a diagram showing a configuration of purchase information notification information;

FIG. 14 is a diagram showing purchase information added to the sales information database;

FIG. 15 is a diagram showing a configuration of sales information notification information.

DETAILED DESCRIPTION OF THE PREFERRED EMBODIMENTS

Embodiments of the present invention will hereinafter be described with reference to the accompanying drawings.

Figure 1:
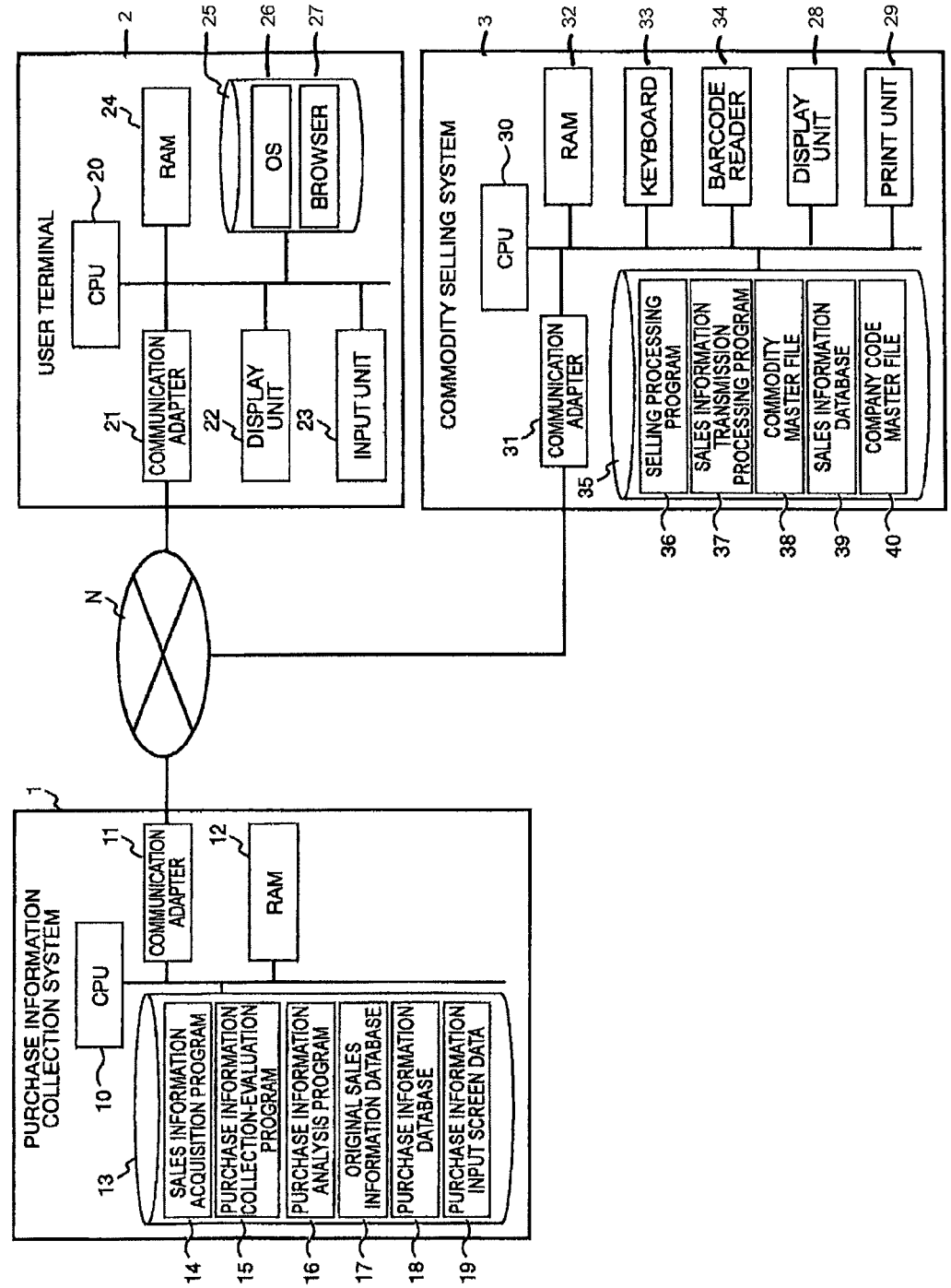
FIG. 1 is a block diagram showing a purchase information collecting system used for performing purchase information collecting method.

FIG. 1 is a block diagram showing the configuration of a purchase information collecting system used to perform purchase information collecting method in one embodiment of the present invention.

The purchase information collecting system is a network system including plural purchase information collecting servers 1, plural user terminals 2, and plural commodity selling systems 3, which can communicate with each other through the network N, though only one purchase information collecting server 1 and one user terminal 2 and one commodity selling systems 3 are illustrated in FIG. 1.

Each purchase information collecting server 1 included in this purchase information collecting system is a server system (computer) that is operated by a manufacture to collect pieces of purchase information (information which consists of personal information on the person who purchase a commodity and information about the purchased commodity) on its own commodities.

Each commodity selling system 3 included in the purchase information collecting system is a system that is located on a retail store to sell commodities. Note that, the commodity selling system 3 shown in this figure is the one that will be located on a small-scale retail store.

Each user terminal 2 included in the purchase information collecting system is an apparatus that is used by person who purchased one or more commodities in the shop with the commodity selling system 3 to sell the purchase information to a manager of a certain purchase information collecting server 1 (to the manufacture that manufactured the commodities) through network N. The present purchase information collecting system includes, as this user terminal 2, an apparatus that consists of a CPU 20, a communication adapter 21, a display unit 22, an input unit 23, a RAM 24, a hard disk 25, etc., and is provided with an OS 26 and a browser 27 in the hard disk 25. That is, a computer capable of browsing the Web pages is used as the user terminal 2 in the purchase information collecting system.

Hereinafter, based on what has been described so far as a premise, configuration and operation of the purchase information collecting system will be explained in depth.

First of all, details of the commodity selling system 3 illustrated in FIG. 1 are discussed.

This commodity selling system 3 is a kind of an electronic cash register, and is composed of a CPU 30, a communication adapter 31, a RAM 32, a keyboard 33, a bar-code reader 34, a hard disk 35, a display unit 28, a print unit 29, etc.

The CPU 30 is a central processing unit that controls this commodity selling system 3. The RAM 32 is a main storage that is used for storing various programs and data. The RAM 32 is also used as a work area of CPU 30 (program). The communication adapter 31 is a device (modem etc.) to communicate with other units on the network N. The keyboard 33 is an input unit consisting of a ten key pad for inputting the number of purchased commodities, a total button for inputting direction to calculate the total, and so on. The bar-code reader 34 is a unit which reads the bar code (JAN (Japan article number) code in this embodiment) printed on the commodity. The display unit 28 is a unit for presenting subtotal, total, and the likes to the store clerk and the purchaser. This display unit 28 generally consists of two liquid crystal displays. The print unit 29 is a unit for printing the receipt that will be handed to the purchaser.

The hard disk 35 is an auxiliary storage that stores various programs and data that CPU 30 uses. In this hard disk 35, a sales processing program 36, a sales information transmission processing program 37, a commodity master file 38, a sales information database 39, and a company code master file 40 are stored.

The company code master file 40 is a file which contains the company code and the company name of the manager of the commodity selling system 3, the shop code and the shop name of the shop where the commodity selling system 3 is located, pieces of server information the number of which equals to the number of the purchase information collecting servers 1 included in the purchase collecting system. The server information is information containing address information (IP address, E-mail address, telephone number, etc.) of one purchase information collecting server 1 and information (manufacture code in this embodiment; details will be discussed later) indicating what information must be transmitted to the purchase information collecting server 1.

The commodity master file 38 is, as schematically shown in FIG. 2, a file containing plural sets of commodity code for a commodity, brand name for the commodity, and sales price (unit price) which the retailer independently set to the commodity. Note that, actual commodity code is information of 12 digits (information consisting of the country code and the commodity manufacture code, which corresponds to EAN UCC company code in EAN code, and the commodity item code, which corresponds to Item reference in EAN code) which excludes the check digit from the information of 13 digits that the bar code (JAN code) indicates, though numerical values of five digits are shown as commodity codes in the FIG. 2 and other FIGs which will be referred to later.

The Sales information database 39 is, as schematically shown in FIG. 3, a database which can contain plural pieces of sales information each of which consists of a company code, a shop code, a date, a deal number, a commodity code, a unit price, a quantity, and a sum.

The sales processing program 36 is a program for causing the commodity selling system 3 to function as an electronic cash register. The sales processing program 36 also causes CPU 30 to perform processing of adding the sales information to the purchase information database 39.

Figure 4:
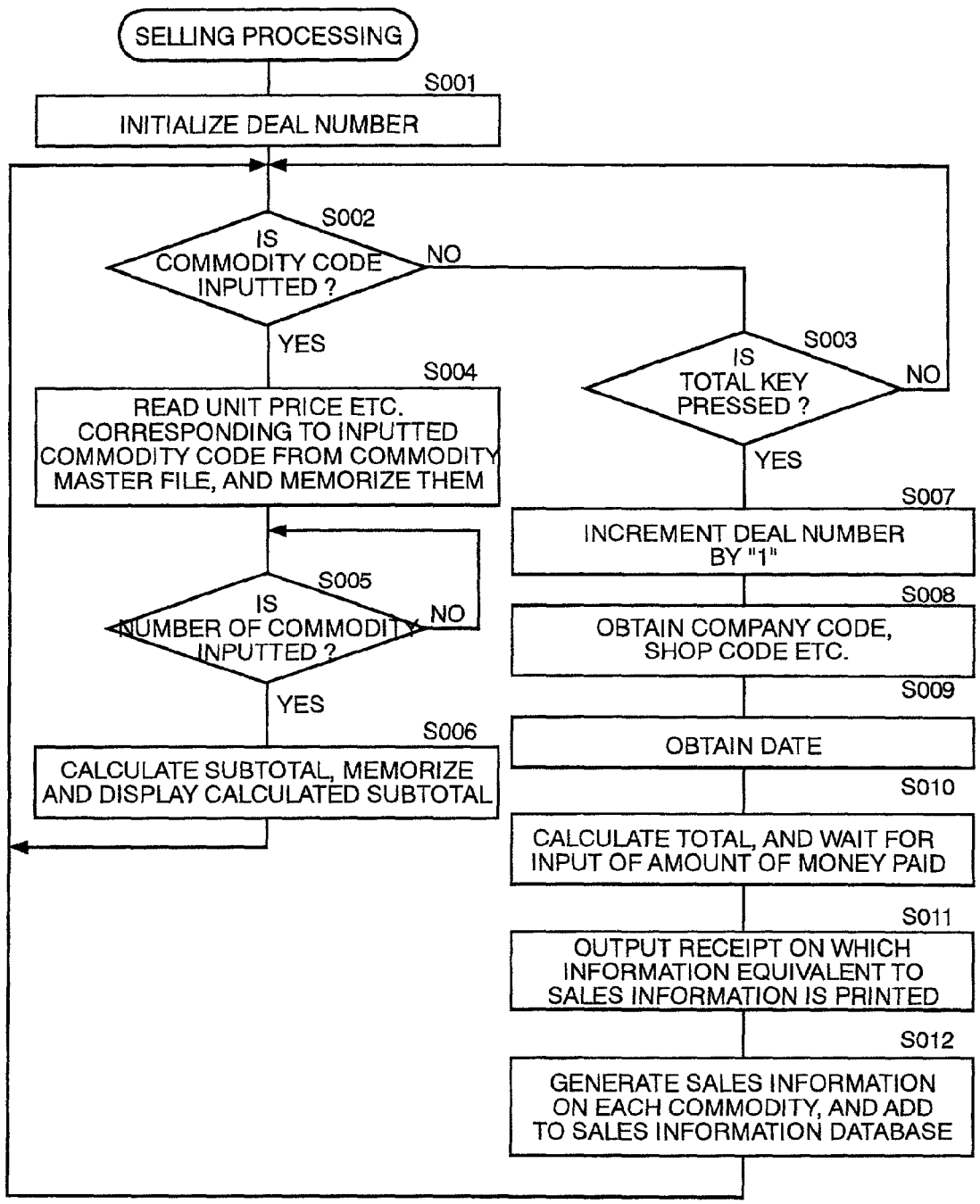
FIG. 4 is a flowchart showing operation procedures of the purchase selling system under the control of a selling processing program.

Concretely, the CPU 30 executing the sales processing program 36 performs the processing whose procedures are shown in FIG. 4.

That is, when sales processing program 36 is initiated, the CPU 30, to begin with, initializes the deal number (accurately, variable for the deal number) in step S001. Note that, the sales processing program 36 is a program that is used in the way in which it is initiated everyday before the store is opened, and is terminated after the store is closed, or in the way in which it is executed without termination for several days. Further, in this step S001, the deal number is initialized to "0" or to the value of the deal number at the point when the termination of the sales processing program 36 is terminated last time.

In the following step S002, the CPU 30 checks whether the bar code is read by the bar-code reader 34, or whether the commodity code is inputted. If the commodity code is not inputted, the CPU 30 checks whether the total key of the keyboard 33 is pressed in step S003. If the total key is not pressed, the CPU 30 again checks whether the commodity code is inputted in step S002.

When detecting the input of the commodity code in the loop consisting of steps S002 and S003, the CPU 30, in step S004, reads the unit price and the brand name associated with the inputted commodity code from the commodity master file 38, and memorizes the unit price and the brand name together with the commodity code.

In the following step S005, the CPU 30 waits for input of the number of commodities by means of the ten key pad of the keyboard 33. When the number of commodities is inputted, the CPU 30 calculates, in the following step S006, the subtotal about the commodities by multiplying the inputted number and the unit price memorized in step S004. Then, the CPU 30 memorizes the inputted number and the calculated subtotal, and displays the brand name, the number and the subtotal on the display unit 28.

Thereafter, the CPU 30 enters the loop consisting of steps S002 and S003 again, thereby waiting for input of the commodity code of the next commodity or pressing of the total key.

When detecting that the total key is pressed in step S003, the CPU 30 increments the deal number by "1" in step S007. If the deal number before the increment is the maximum value of the deal number (for instance, "1999"), the CPU 30 sets the deal number to "1" in this step S007.

Subsequently, in step S008, the CPU 30 reads the company code, the company name, the shop code, and the shop name from the company code master file 40. In other words, the CPU 30 obtains the company code and the company name of the retailer managing the commodity selling system 3, the shop code and shop name of the shop where the commodity selling system 3 is located.

Thereafter, the CPU 30 obtains the current date in step S009. In the following step S010, the CPU 30 calculates the total of the subtotals on the present deal, and displays the calculated total on the display unit 28. Thereafter, the CPU 30 waits for input of the quantity of money paid by the purchaser.

When the quantity of money is inputted, the CPU 30 finishes processing of step S010, and makes the print unit 29 to output the receipt on which detailed information to the deal is printed in the following step S011. More concretely, the CPU 30 makes the print unit 29 to output the receipt on which printed are information corresponding to the company code (company code itself and/or company name), information corresponding to the shop code (shop code itself and/or shop name), the date, the deal number, one or more pieces of information each corresponding to the commodity code (commodity code itself and/or commodity name).

In the following step S012, the CPU 30 generates a piece of sales information for each purchased commodity based on the pieces of information that have been obtained in steps S001-S010, and adds them to the sales information database 39 (see FIG. 3). Thereafter, the CPU 30 again enters the loop consisting of steps S002 and S003, and waits for input of the commodity code concerning with a next deal.

Hereinafter, details of the sales information transmission processing program 37 are discussed.

The sales information transmission processing program 37 is a program that is used in the way in which it is initiated everyday by the clerk after the store is closed (or before the store is opened) or in the way in which it is initiated automatically everyday at the fixed time (for instance, at twelve o'clock midnight).

Figure 5:
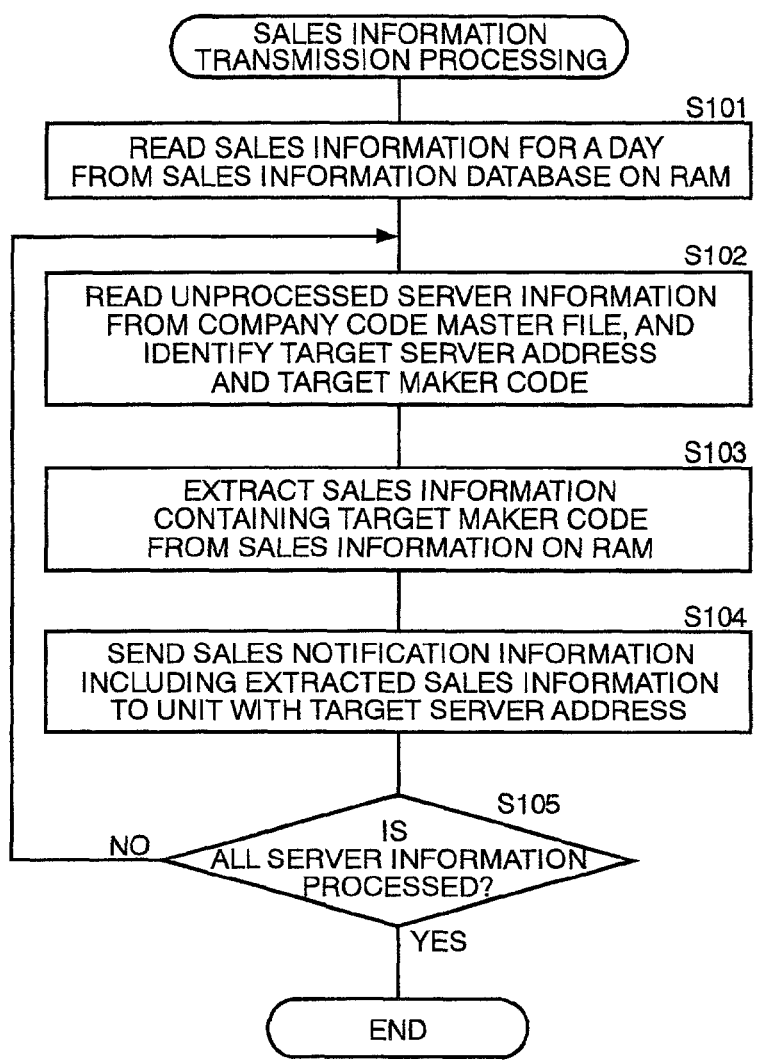
FIG. 5 is a flowchart showing operation procedures of the purchase selling system under the control of a sales information transmission processing program.

As shown in FIG. 5, the CPU 30 executing this sales information transmission program 37, in step S101, reads from the sales information database 39 pieces of the sales information for one day (usually, for the preceding day) to be processed, and memorize them on RAM 32.

Then, the CPU 30 enters the loop consisting of steps S102-S105.

In step S102 of this loop, the CPU 30 reads one unprocessed server information from the company code master file 40, and an identify the address information and a manufacture code included in it as target server information and target manufacture code, respectively.

In the following step S103, the CPU 30 extracts all pieces of sales information on the commodities of the manufacture that identified by the target manufacture code (all pieces of sales information including the commodity code that contains the target manufacture code) from the pieces of sales information on RAM 32.

In the following step S104, the CPU 30 transmits sales information notification information that contains the extracted sales information to the unit having the target server address (i.e., the purchase information collecting server 1 managed by the manufacture identified by the target manufacture code). If no sales information is extracted in step S103, the CPU 30 does nothing in this step S104.

In the following step S105, the CPU 30 checks whether all pieces of server information in the company code master file 40 have been processed. If unprocessed server information remains, the CPU 30 reads another piece of server information from the company code master file 40 in step S102.

If all pieces of server information in the company code master file 40 have been processed, the CPU 30 ends operation according to the sales information transmission processing program 37.

Next, details of the purchase information collecting server 1 are explained.

The purchase information collecting server 1 is, as shown in FIG. 1, a computer consisting of a CPU 10, a communication adapter 11, a RAM 12, a hard disk 13, etc. The hard disk 13 of the purchase information collecting server 1 stores a sales information acquisition program 14, a purchase information collection and evaluation program 15, a purchase information analysis program 16, a purchase information database 18, and a purchase information input screen data 19.

The purchase information input screen data 19 is a data for making the user terminal 2 (browser 27) to display a purchase information input screen (a king of a Web page).

The original sales information database 17 is a database for storing plural pieces of sales information that are transmitted from the commodity selling systems 3 as elements of the above-mentioned sales information notification information. This original sales information database 17 is, as shown in FIG. 6, so configured as to be able to store a U-flag which takes the value of "1" or "0" for each piece of sales information. The U-flag is a data indicating that the sales information has been already used for verifying the purchase information (details will be discussed later). When a piece of sales information is added to the original sales information database 17, the U-flag for the added information is set to "0".

The purchase information database 18 is a database for holding pieces of collected purchase information (information which consists of the sales information and the personal information). As shown in FIG. 7, the purchase information database 18 is so configured as to be able to hold an evaluation result identifier for each piece of purchase information. The evaluation result identifier is a data indicating the evaluation result concerning the reliability of the purchase information. As the evaluation result identifier, "OK" indicating that the purchase information is reliable (valid), or "NG" indicating that the purchase information is unreliable (invalid), or "UNIDENTIFIED" indicating that the reliability of the purchase information cannot be identified is set.

The purchase information analysis program 16 is a program for statistical analysis of the plural pieces of sales information (usually, pieces of sales information with the evaluation result identifier "OK") in the purchase information database 18. The manager (manufacture) of the purchase information collecting server 1 obtains data for the product development strategy and/or the sales strategy using this purchase information analysis program 16.

The sales information acquisition program 14 is a program that is always executed by CPU 10.

As shown in FIG. 8, the CPU 10 executing the sales information acquisition program 14 usually monitors receiving of the sales information notification information (see step S104 in FIG. 5) from the commodity selling systems 3 in step S201. When receiving the sales information notification information transmitted by one commodity selling system 3, the CPU 10, in step S202, adds all pieces of sales information included in the received sales information notification information to the original sales information database 17, and sets each U-flag of the added sales information to "0".

After performing such processing in step S202, the CPU 10 again waits for receiving of the sales information notification information in step S201.

The purchase information collection and evaluation program 15 is a program for making the CPU 10 to collect purchase information and for causing the purchase information collecting server 1 as a Web server computer. That is, the purchase information collection and evaluation program 15 includes Web server program and application programs such as CGI programs.

FIG. 9 is a flowchart showing the operation procedures of the CPU 10 under the control of the purchase information collection and evaluation program 15.

As shown in this flowchart, the CPU 10 executing the purchase information collection and evaluation program 15 usually monitors (waits for) receiving of various HTTP requests in step S301. When receiving a HTTP request, the CPU 10 distinguishes the kind of HTTP request in step S302, and performs processing corresponding to the distinction result in step S303, step S304, or steps S305-S307.

More concretely, in step S301, the CPU 10 monitors receiving of a purchase information input screen request, a purchase information notification request, and other requests.

If judging that the received request is other request in step S302, the CPU 10 performs the processing corresponding to the received request in step S304. Thereafter, the CPU 10 monitors receiving of HTTP requests again in step S301.

The purchase information input screen request is a request that is transmitted by the user terminal 2. The user terminal 2 transmits this purchase information input screen request when, for example, the browser 27 is initiated and then the URL for the purchase information input screen is inputted into the address bar of the browser window.

When judging that the received HTTP request is the purchase information input screen request in step S302, the CPU 10 transmits the purchase information input screen data 19 in the hard disk 13 back to the user terminal 2 which has transmitted the purchase information input screen request. Thereafter, the CPU 10 monitors receiving various HTTP requests in step S301.

The purchase information notification request is a HTTP request that is transmitted by the user terminal 2 that received the purchase information input screen data 19. Therefore, before explaining the operation of the CPU 10 about the purchase information notification request, the operation of the user terminal 2 which received purchase information input screen data 19 (in other words, contents of the purchase information input screen data 19) is discussed.

Figure 10:
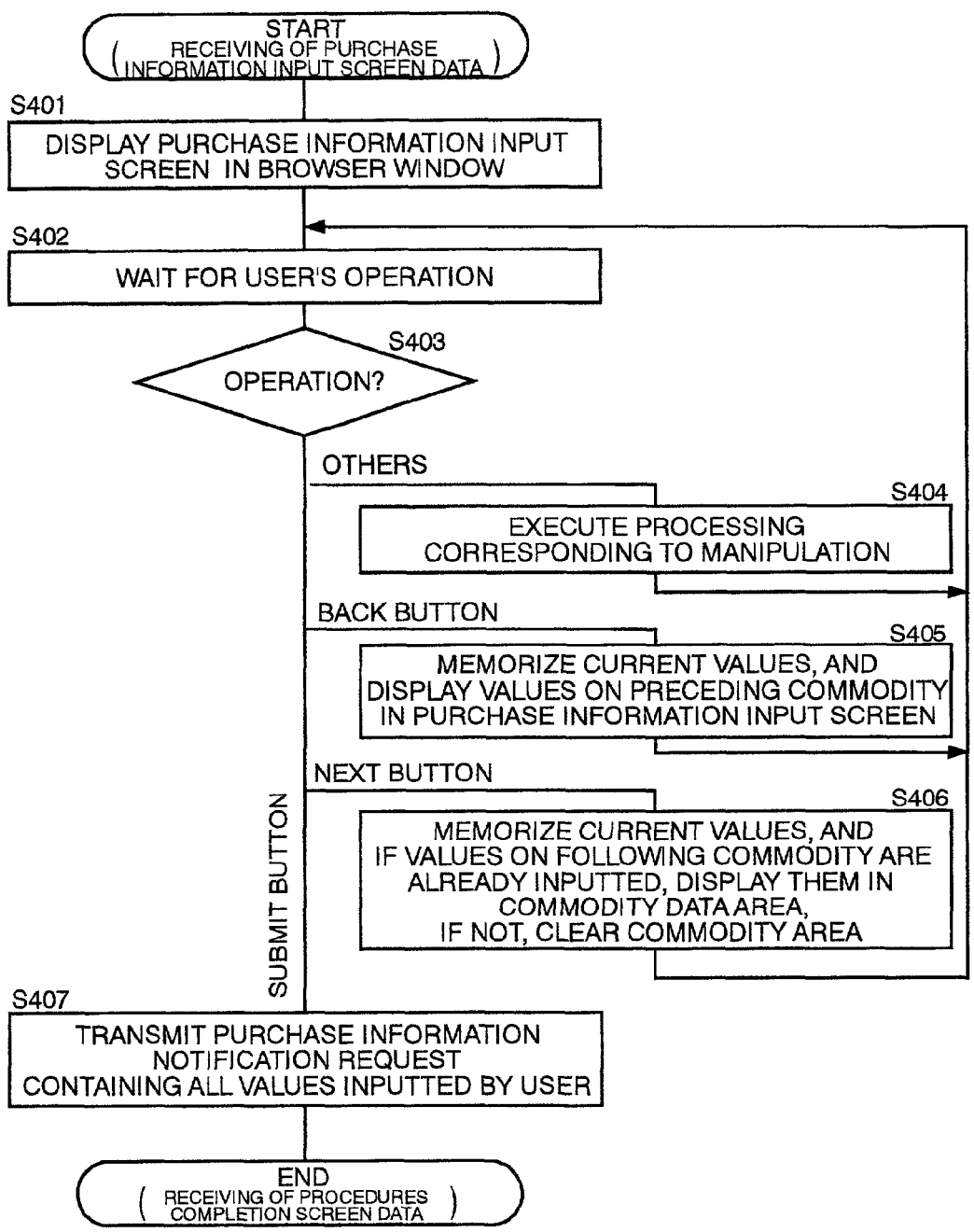
FIG. 10 is a flowchart showing operation procedures of a user terminal.

FIG. 10 is the flowchart showing the operation procedures of the CPU 20 from receiving the purchase information input screen data 19 until transmitting the purchase information notification request.

As shown in this flowchart, the CPU 20 (browser 27) receiving purchase information input screen data 19 performs, in step S401, processing for displaying the purchase information input screen in the browser window based on the received purchase information input screen data 19.

In this step S401, for instance, the purchase information input screen shown in FIG. 11 is displayed. That is, displayed is the purchase information input screen provided with text boxes 51-55, a commodity list box 56, a deal information input area 57, a "BACK" button 60, a "NEXT" button 61, and a "SUBMIT" button 50.

The text boxes 51-55 on this purchase information input screen are controls into which the user should set the name, the ZIP code, the address, the age, and the occupation.

The commodity list box 56 is a control (drop down list box) which the user should manipulate so as to appear the commodity code and brand name of the purchased commodity in it.

The deal information input area 57 is an area where arranged are plural sets of six kinds of controls (two drop down list boxes and four text boxes) into which the user should set the company name, the shop name, the purchase day, the deal number, the unit price, and the quantity about the purchased commodity.

The "NEXT" button 61 is a button which the user should press to edit (to newly input, to verify, to alter) values about the following commodity. The "BACK" button 60 is a button which the user should press to edit (to verify, to alter) the values about the preceding commodity. The "SUBMIT" button 50 is a button that the user should press when the input of various values is completed. Note that, the purchase information input screen displayed in step S401 is the one that no information is presented in each control, though, in the controls on the purchase information input screen of FIG. 11, various pieces of information (name and ZIP code, etc.) are shown.

After finishing the processing of step 401, the CPU 20 waits for user's operation to the purchase information input screen. When the user operates the purchase information input screen, the CPU 20 distinguishes kind of operation in step S403, and performs processing corresponding to the distinction result in one step among steps S404-S407.

Concretely, when operation except for pressing "BACK" button 60, "NEXT" button 61 or "SUBMIT" button 50 is performed, the CPU 20 performs, in step S404, processing corresponding to the operation. In this step S404, the CPU 20 performs, for instance, processing for displaying in the text box 51 a character string (name) inputted by the user, processing for displaying the list of the commodity codes and the brand names below the commodity list boxes 56, and for displaying the commodity code and the brand name selected from the list in the commodity list box 56. Thereafter, the CPU 20 again monitors the user operation to the purchase information input screen in step S402.

When the "NEXT" button 61 is pressed, CPU 20 performs, in step S406, processing of memorizing the values inputted in the commodity list box 56 and the deal information input area 57 as the values of the current commodity. Further, the CPU 20 judges whether values concerning the following commodity are already inputted. If the values are already inputted, the CPU 20 displays the values in the commodity list box 56 and the deal information input area 57, and if not, the CPU 20 clears the commodity list box 56 and the deal information input area 57. Thereafter, the CPU 20 ends the processing of step S406, and waits for the user operation in step S402.

When "BACK" button 60 is pressed, the CPU 20 performs processing of memorizing the values inputted in the commodity list box 56 and the deal information input area 57 as the values of the current commodity in step S405. Subsequently, the CPU 20 displays the values of the preceding commodity in the commodity list box 56 and the deal information input area 57. Thereafter, the CPU 20 ends the processing of step S405, and waits for the user operation in step S402.

Incidentally, the "BACK" button 60 is not active when the purchase information input screen is in the state where the values of the first commodity can be inputted, and the "NEXT" button 61 is not active when the purchase information input screen is in the state where some required values are not set.

When the "SUBMIT" button 50 is pressed, the CPU 20 creates, in step S407, the purchase information notification information with the format shown in FIG. 12 by combining the personal information and every piece of sales information that the user inputted directly or indirectly. Then, the CPU 20 transmits the purchase information notification request that is an HTTP request consisting of the created purchase information notification information and a prescribed URL onto the Internet, and then terminates the processing shown in FIG. 10.

Hereinafter, the operation of the CPU 10 receiving the purchase information notification request is discussed referring again to FIG. 9.

When detecting that the purchase information notification request is received in step S302, the CPU 10 performs the purchase information evaluation processing in step S305.

Figure 13:
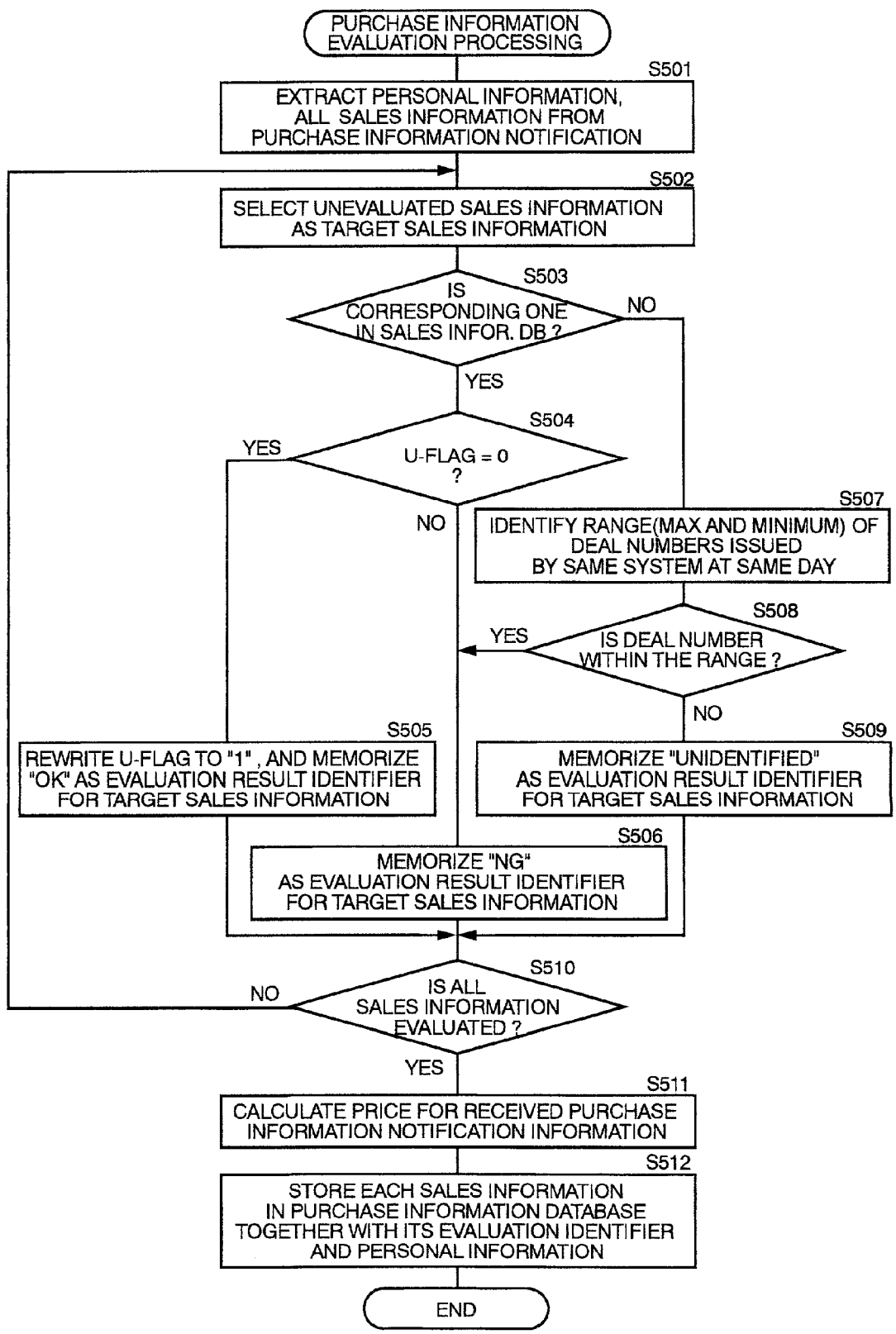
FIG. 13 is a flowchart of purchase information evaluation processing performed in step S305 of FIG. 9.

As shown in FIG. 13, the CPU 10 performing the purchase information evaluation processing extracts the personal information and all pieces of sales information from the received purchase information notification information in step S501.

Thereafter, the CPU 10 enters the loop consisting of steps S502-S509, and then selects one piece of unprocessed sales information from the pieces of extracted sales information as the target sales information in step S502.

In the following step S503, the CPU 10 tries to retrieve from the original sales information database 17 the sales information equivalent to the target sales information with using the company code, the shop code, the date, the deal number and commodity code in the target sales information as search keys. If such sales information (denoted hereinafter as corresponding sales information) is retrieved, the CPU 10 judges whether the U-flag of the corresponding sales information is "0" in step S504.

If the U-flag of the corresponding sales information is "0", the CPU 10 rewrites the U-flag to "1", and memorize "OK" as the evaluation result identifier of the target sales information in step S505.

On the other hands, if the U-flag of the corresponding sales information is "1", the CPU 10 memorize "NG" as the evaluation result identifier of the target sales information in step S506.

If the corresponding sales information is not retrieved in step S503, the CPU 10 extracts sales information from the original sales information database 17 with using the company code, the shop code and the date in the target sales information as search keys. And, the CPU 10 recognized the maximum and minimum deal numbers in the extracted sales information. In other word, the CPU 10 performs, in this step S507, processing for obtaining the range (minimum and maximum values) of the deal numbers concerning the plural pieces of sales information that are created by the same commodity selling system 3 that created the target sales information at the same day when the target sales information is created.

In the following step S508, the CPU 10 judges whether the deal number of the target sales information falls in the obtained range. If the deal number of the target sales information does not fall in the range, the CPU 10 memorizes the "UNIDENTIFIED" as the evaluation result identifier of the target sales information in step S509. That is, in this case, the corresponding sales information on the target sales information may not have been transmitted from the commodity selling system 3, the "UNIDENTIFIED" indicating that the reliability of the purchase information cannot be identified is therefor memorized as the evaluation result identifier.

On the other hand, if the deal number of the target sales information falls in the range, the CPU 10 memorizes "NG" as an evaluation result identifier in step S506. That is, the CPU 10 branches for "YES" (to step S509) only when the original sales information database 17 holds the sales information on the preceding and following deal to the deal concerning with the target sales information. In this case, there is no possibility of that the corresponding sales information on the target sales information is not yet transmitted from the commodity selling system 3, "NG" indicating that the purchase information is unreliable is therefore memorized as the evaluation result identifier.

After deciding the evaluation result identifier on the target purchase information at one step among steps S505, S506 and S509, the CPU 10 judges that evaluation of all pieces of extracted sales information is completed in step 510. If the evaluation of all pieces of sales information is not completed, the CPU 10 proceeds with the loop to evaluate the following sales information.

If the evaluation of all pieces of sales information is completed, the CPU 10 exits the loop, and then calculates and memorizes the price for the received purchase information notification information by multiplying the number of sales information to which "OK" is given and the prescribed unit price in step S511.

In the following step S512, the CPU 10 performs processing of adding to the purchase information database 18 (see FIG. 7) each pieces of the sales information together with its evaluation result identifier and the personal information.

Thereafter, the CPU 10 terminates the purchase information evaluation processing, and then, in step S306 in FIG. 9, creates and transmits a procedures completion screen data, which is a data for making the user terminal 2 (browser 27) to display a procedures completion screen on which the calculated price is shown, to the user terminal 2 transmitted the purchase information notification request.

Afterwards, the CPU 10 performs the processing to pay the user the calculated price in step S307. Note that, in this step S307, the CPU 10 performs, usually, only processing of adding the calculated price to the total price about the user. If the total price becomes higher than a prescribed value, the CPU 10 also performs processing for offering the user the money or article for the total price in the step S307.

Hereinafter, the overall operation of the purchase information collecting system is explained.

In the explanation, it is assumed that a user whose name, address, age, and occupation are Fujitsu Taro, Tokyo Shinagawa, 30, and office worker respectively purchased one commodity identified by the commodity code "49101" and two commodities each identified by the commodity code "49202" at shop (Tokyo branch of A-supermarket) identified by the company code "001" and the shop code "10" on Dec. 24, 2000. It is also assumed that the commodity selling system 3 on the shop gave the deal number "001" to the deal with Fujitsu Taro, and the commodity of the commodity code "49101" and the commodity of the commodity code "49102" are commodities of the same manufacture.

In this case, the CPU 30 adds to the sales information database 39 two pieces of sales information schematically shown in FIG. 14.

If the adding changes the sales information database 39 into the one shown in FIG. 3, the CPU 30 performing the sales information transmitting processing transmits to the purchase information collecting server 1 that is managed by the manufacture of commodities of the commodity codes "49101" and "49102" the purchase information notification information schematically shown in FIG. 15.

The CPU 10 in the purchase information collecting server 1 receiving this purchase information notification information adds each piece of purchase information in the purchase information notification information together with the U-flag of "0" to the original sales information database 17. Hence, the original sales information database 17 becomes, for instance, the one shown in FIG. 6.

If the CPU 10 receives, in this condition, the purchase information notification information (the purchase information notification request) shown in FIG. 12 (or if the user "Fujitsu Taro" operates his user terminal 2 so as to display the purchase information input screen shown in FIG. 11 and then presses the "SUBMIT" button 50), the CPU 10 operates as follows.

The CPU 10 begin to perform processing of steps S305-S307 in FIG. 9, and performs the purchase information evaluation processing (S305, FIG. 13) at first.

In the purchase information evaluation processing, the sales information, which containing the company code "001", the shop code "10", the date "2000/12/24" and the deal number "001", is evaluated as the reliable one because the corresponding sales information exists in the original sales information database 17 and its U-flag is "0".

On the other hand, the sales information, which containing the company code "002", the shop code "222", the date "2000/12/25" and the deal number "066", is evaluated as the not-reliable one because in the purchase information database 17 the corresponding sales information is not stored and two pieces of sales information on the deal before and after the deal on the sales information are stored.

The sales information, which containing the company code "003", the shop code "011", the date "2000/12/25" and the deal number "010", is evaluated as the one the reliability of which cannot be identified, because there is no sales information containing the company code "003" in the original sales information database 17.

Then, in steps S512, based on these evaluation results, the purchase information notification information is, as shown in FIG. 7, stored into the purchase information database 18 as three pieces of purchase information to which "OK", "NG", and "UNIDENTIFIED" are set respectively. Incidentally, because only one piece of sales information is judged to be reliable, in step S307, performed is processing of paying the price for one piece of sales information to the user.

In the present purchase information collection system, as mentioned before, using the purchase information analysis program 16, various data for the product development strategy and/or the sales strategy are derived from the pieces of purchase information with the evaluation result identifier "OK" in this purchase information database 18.

Purchase information with the evaluation result identifier "OK" in the purchase information database 18 is information the validity of which is confirmed by checking the existence of the corresponding sales information. Moreover, since the purchase information collecting system is so configured that each purchaser can offer (sell) purchase information easily, many pieces of sales information are collected and stored in the purchase information database 18 of the purchase information collecting system.

Consequently, according to the present purchase information collection system, the manager of each purchase information collection server 1 can get extremely effective data for the product development strategy and/or the sales strategy base on the collected purchase information.

MODIFIED EXAMPLE

The purchase information collecting system discussed above can be modified in a variety of forms. For instance, the purchase information collecting system is the system in which each commodity selling system 3 in the shop transmits the sales information notification information. The purchase information collecting system, however, may also be configured as a system in which the POS system including a main server computer which has the ability to transmits the sales information notification information, and plural POS terminals each of which dose not have the ability to transmits the sales information notification information is used in place of plural commodity selling systems 3 managed by the same manufacture. Moreover, the commodity selling system 3 may be configured to transmit sales information to the purchase information collecting server 1 every time a deal is made.

Further, the purchase information collecting system may be configured to have the purchase information collecting server 1 that is managed by a wholesale company or a research company. Note that, such purchase information collecting system can be realized by modifying the company code muster file 40 to the one containing information that consists of address information and plural manufacture codes (or plural commodity codes) as server information, and modifying processing of step S103 to the one in which all pieces of sales information containing one of plural manufacture codes (or commodity codes) in the server information is extracted.

Moreover, the purchase information collecting system may be configured so that purchase information notification information is transmitted by E-mail. The purchase information collecting system may be configured so that the purchaser is notified of sales information by means of record on an IC card or by means of a printed matter or an electronic data via a credit card company.

Furthermore, if, as commodity selling system 3 (unit which decides the deal number), used is unit that cannot identified by the company code and the shop code but the company code and the shop code and the unit number (register number), it is necessary to modify the purchase information collecting system so that sales information including the unit number is transmitted to the purchase information collecting server 1.

What is claimed is:

1. A purchase information collecting method for collecting information on a purchaser of one or more commodities using a network with a server apparatus, the method comprising:
    executing using a processing device:
        receiving a first sales information, which identifies a deal of a first commodity, from a retail seller of the first commodity, wherein the first sales information is generated by the retail seller of the first commodity and identifies the retail seller of the first commodity and identifies a time and place at which the first commodity was sold by the retail seller of the first commodity;
        storing the received first sales information in a first storing part;
        receiving purchase information, which comprises personal information of a purchaser of a second commodity and a second sales information, from the purchaser of the second commodity, where the second sales information is generated by a retail seller of the second commodity when the second commodity is sold, and where the second sales information identifies the retail seller of the second commodity and identifies a time and place at which the second commodity was sold by the retail seller of the second commodity;
        based on the retail sellers, times and places identified by the first sales information and the second sales information, determining whether the second sales information included in the received purchase information is stored in said first storing part;
        storing the received purchase information as valid purchase information in a second storing part upon the second sales information being stored in the first storing part;
        extracting sales information containing a first information of the purchase information from said first storing part upon the second sales information included in the received purchase information not being stored in the first storing part, including a range of deal numbers of a second information between a minimum deal number of the second information to a maximum deal number of the second information;
        storing the purchase information as invalid purchase information in the second storing part upon the second information of the purchase information having a deal number that is within the a range of deal numbers of a second information between a minimum deal number of the second information to a maximum deal number of the second information; and
        storing the purchase information as unidentified validity purchase information in the second storing part upon the second information of the purchase information not having a deal number within the range of deal numbers.

2. A purchase information collecting method according to claim 1, wherein the purchase information further comprises:
    the first information for identifying the seller of the second commodity;
    the second information for identifying a deal made by the seller of the second commodity; and
    a third information for identifying the second commodity.

3. A purchase information collecting method according to claim 2, wherein the second information included in the purchase information indicates a time order of deals made by the seller of the second commodity identified with the first information.

4. A purchase information collecting method according to claim 3, wherein the second information included in the purchase information further comprises information indicating a date of the deal.

5. A purchase information collecting method according to claim 1, further comprising transmitting to a computer operated by the purchaser a screen data that makes a browser program executed in the computer display a screen containing an input area for inputting the purchase information and an item for inputting an instruction to submit the purchase information in the input area to said server apparatus.

6. A computer readable storage medium that stores a purchase information collecting program for causing a computer capable of communicating with other computers to perform processing comprising:
    receiving a first sales information, which identifies a deal of a first commodity, from a retail seller of the first commodity, wherein the first sales information is generated by the retail seller of the first commodity and identifies the retail seller of the first commodity and identifies a time and place at which the first commodity was sold by the retail seller of the first commodity;
    storing the received first sales information in a first storing part;
    receiving purchase information, which comprises personal information of a purchaser of a second commodity and a second sales information, from the purchaser of the second commodity, where the second sales information is generated by a retail seller of the second commodity when the second commodity is sold, and where the second sales information identifies the retail seller of the second commodity and identifies a time and place at which the second commodity was sold by the retail seller of the second commodity;
    storing the received purchase information as valid purchase information in a second storing part when, based on the retail sellers, times and places identified by the first sales information and the second sales information, the second sales information included in the received purchase information is stored in said first storing part;

extracting sales information containing a first information of the purchase information from said first storing part upon the second sales information included in the received purchase information not being stored in the first storing part, including a range of deal numbers of a second information between a minimum deal number of the second information to a maximum deal number of the second information;

storing the purchase information as invalid purchase information in the second storing part upon the second information of the purchase information having a deal number that is within the range of deal numbers between the minimum deal number of the second information and the maximum deal number of the second information; and storing the purchase information as unidentified validity purchase information in the second storing part upon the second information of the purchase information not having a deal number within the range of deal numbers.

7. The computer readable storage medium that stores the purchase information collecting program according to claim 6, wherein the purchase information further comprises:
the first information for identifying the seller of the second commodity;
the second information for identifying a deal made by the seller of the second commodity; and
a third information for identifying the second commodity.

8. The computer readable storage medium that stores the purchase information collecting program according to claim 7, wherein the second information included in the purchase information indicates a time order of deals made by the seller of the second commodity identified with the first information.

9. A purchase information collecting method for collecting a deal between a purchaser and a seller, comprising:
executing using a processing device:
receiving from a retail seller a first deal identifying information that identifies the retail seller of a first commodity and identifies a time and place at which the first commodity was sold by the retail seller of the first commodity;
storing the first deal identifying information in a first storing part;
receiving from a purchaser a second deal identifying information and personal information, where the second deal identifying information was generated by a retail seller when selling a second commodity and then inputted by the purchaser, and where the second deal identifying information identifies the retail seller of the second commodity and identifies a time and place at which the second commodity was sold by the retail seller of the second commodity;
comparing the second deal identifying information and the first deal identifying information stored in said first storing part using the retail sellers, times and places identified by the first and second deal identifying information;
extracting sales information including a range of deal numbers of the second deal identifying information between a minimum deal number of the second deal identifying information to a maximum deal number of the second deal identifying information;
storing, when it is judged that the deal number of the second deal identifying information falls within the range of deal numbers, the second deal identifying information, together with an identifier as invalid information, in a second storing part; and
storing, when it is judged that the deal number of the second deal identifying information does not fall within the range of deal numbers, the second deal identifying information together with an identifier indicating a validity of the information is not identified.

10. A purchase information collecting method according to claim 9, further comprising:
storing, when an equal comparison is made, the second deal identifying information and the personal information in a second storing part.

11. A computer readable storage medium that stores the purchase information collecting program for causing a computer to perform processing comprising:
receiving from a retail seller a first deal identifying information that identifies the retail seller of a first commodity and identifies a time and place at which the first commodity was sold by the retail seller of the first commodity;
storing the first deal identifying information in a first storing part; receiving from a purchaser a second deal identifying information and personal information, where the second deal identifying information was generated by a retail seller when selling a second commodity and was then inputted by the purchaser, and where the second deal identifying information identifies the retail seller of the second commodity and identifies a time and place at which the second commodity was sold by the retail seller of the second commodity;
comparing the second deal identifying information and the first deal identifying information stored in said first storing part using the retail sellers, times and places identified by the first and second deal identifying information;
extracting sales information including a range of deal numbers of the second deal identifying information between a minimum deal number of the second deal identifying information to a maximum deal number of the second deal identifying information;
storing, when it is judged that the deal number of the second deal identifying information falls within the range of deal numbers, the second deal identifying information, together with an identifier as invalid information, in a second storing part; and
storing, when it is judged that the deal number of the second deal identifying information does not fall within the range of deal numbers, the second deal identifying information together with an identifier indicating a validity of the information is not identified.

12. A purchase information collecting apparatus for collecting information on a deal between a purchaser and a seller, comprising:
a unit that receives from a retail seller first deal identifying information that identifies the retail seller of a first commodity and identifies a time and place at which the first commodity was sold by the retail seller of the first commodity;
a unit that stores the first deal identifying information in a first storing part;
a unit that receives from a purchaser second deal identifying information and personal information, where the second deal identifying information was generated by a retail seller when selling a second commodity and was then inputted by the purchaser, and where the second deal identifying information identifies the retail seller of the second commodity and identifies a time and place at which the second commodity was sold by the retail seller of the second commodity;

a unit that compares the second deal identifying information and the first deal identifying information stored in said first storing part using the retail sellers, times and places identified by the first and second deal identifying information;

a unit that extracts sales information including a range of deal numbers of the second deal identifying information between a minimum deal number of the second deal identifying information to a maximum deal number of the second deal identifying information;

a unit that stores, when it is judged that the deal number of the second deal identifying information falls within the range of deal numbers, the second deal identifying information, together with an identifier as invalid information, in a second storing part; and a unit that stores, when it is judged that the deal number of the second deal identifying information does not fall within the range of deal numbers, the second deal identifying information together with an identifier indicating a validity of the information is not identified.

13. A method performed by a computing system of a commodity seller to obtain from an end purchaser personal information of the end purchaser, where the end purchaser has purchased, from a retailer, a commodity of the commodity seller at a retailer's point-of-sale (POS) system that transacts retail sales to end purchasers of commodities that were previously purchased by the retailer from commodity sellers, the POS system generating corresponding electronic sale transactions, where an electronic sale transaction has information to allow identification of a time and place of the transaction and a commodity sold to an end purchaser and a commodity seller from who the retailer purchased the commodity sold, the method comprising:

at the computing system of the commodity seller, electronically receiving the electronic sales transactions corresponding to the commodities that the retailer previously purchased from the commodity seller, electronically receiving, from an end purchaser's terminal, transaction information and personal information of the end purchaser entered at the terminal, where the transaction information is related to a commodity of the commodity seller that the end purchaser purchased from the retailer with the retailer's POS system and includes a time and place of the corresponding transaction, and then the computing system of the commodity seller, based on the transaction information received from the end purchaser and a corresponding received electronic sale transaction of the commodity and based on the times and places thereof, storing the end purchaser's personal information and information relating the personal information to information about the commodity purchased by the end purchaser;

extracting sales information containing first information of the purchase information from said first storing part upon the second sales information included in the received purchase information not being stored in the first storing part including a range of deal numbers of second information between a minimum deal number of second information to a maximum deal number of second information;

storing the purchase information as invalid purchase information in the second storing part upon second information of the purchase information having a deal number that is within the range of deal numbers between the minimum deal number of second information and the maximum deal number of second information; and storing the purchase information as unidentified validity purchase information in the second storing part upon the second information of the purchase information not having a deal number within the range of deal numbers.

14. A method performed by a retailer's point-of-sale (POS) system on a computing system, the POS system generating corresponding electronic sale transactions, where an electronic sale transaction has information to allow identification of a time and place of the transaction and a commodity sold to an end purchaser and a commodity seller from who a retailer previously purchased the commodity sold, the method comprising:

at the computing system of the commodity seller, electronically receiving the electronic sales transactions corresponding to the commodities that the retailer previously purchased from the commodity seller, electronically receiving, from an end purchaser's terminal, transaction information and personal information of the end purchaser entered at the terminal, where the transaction information is related to a commodity of the commodity seller that the end purchaser purchased from the retailer with the retailer's POS system and includes data corresponding transaction;

evaluating the data at the computing system of the commodity seller, based on the transaction information received from the end purchaser and a corresponding received electronic sale transaction of the commodity and based on the data, identifying sales information that has been already used for verifying the purchase information, storing the end purchaser's personal information and information relating the personal information to information about the commodity purchased by the end purchaser;

extracting sales information containing first information of the purchase information from a first storing part upon the second sales information included in the received purchase information not being stored in the first storing part including a range of deal numbers of second information between a minimum deal number of second information to a maximum deal number of second information;

storing the purchase information as invalid purchase information in a second storing part upon second information of the purchase information having a deal number that is within the range of deal numbers between the minimum deal number of second information and the maximum deal number of second information; and storing the purchase information as unidentified validity purchase information in the second storing part upon the second information of the purchase information not having a deal number within the range of deal numbers.

* * * * *

UNITED STATES PATENT AND TRADEMARK OFFICE
CERTIFICATE OF CORRECTION

| | | |
|---|---|---|
| PATENT NO. | : 8,612,338 B2 | Page 1 of 1 |
| APPLICATION NO. | : 09/986026 | |
| DATED | : December 17, 2013 | |
| INVENTOR(S) | : Hiroyuki Kishi | |

It is certified that error appears in the above-identified patent and that said Letters Patent is hereby corrected as shown below:

On the Title Page, In Column 2 (Primary Examiner), Line 1, delete "Kristen" and insert -- Kirsten --, therefor.

In the Claims:
In Column 14, Line 7, In Claim 1, delete "the a" and insert -- the --, therefor.

Signed and Sealed this
Twenty-fifth Day of March, 2014

Michelle K. Lee
*Deputy Director of the United States Patent and Trademark Office*